United States Patent
Carlson et al.

(10) Patent No.: US 9,068,099 B2
(45) Date of Patent: Jun. 30, 2015

(54) HYDROPHOBIC COATINGS THAT PROVIDE RENEWABLE HYDROPHILIC SURFACE

(71) Applicant: Empire Technology Development LLC, Wilmington, DE (US)

(72) Inventors: William Brenden Carlson, Seattle, WA (US); Gregory D. Phelan, Cortland, NY (US)

(73) Assignee: Empire Technology Development LLC, Wilmington, DE (US)

( * ) Notice: Subject to any disclaimer, the term of this patent is extended or adjusted under 35 U.S.C. 154(b) by 25 days.

(21) Appl. No.: 13/881,416

(22) PCT Filed: Nov. 21, 2012

(86) PCT No.: PCT/US2012/066264
§ 371 (c)(1),
(2) Date: Apr. 25, 2013

(87) PCT Pub. No.: WO2014/081425
PCT Pub. Date: May 30, 2014

(65) Prior Publication Data
US 2014/0194573 A1     Jul. 10, 2014

(51) Int. Cl.
C09D 143/00     (2006.01)
B05D 5/00       (2006.01)
B01D 71/00      (2006.01)

(52) U.S. Cl.
CPC ............ *C09D 143/00* (2013.01); *B01D 71/00* (2013.01)

(58) Field of Classification Search
CPC .................................................. C09D 143/00
USPC .................................................... 524/547, 857
See application file for complete search history.

(56) References Cited

U.S. PATENT DOCUMENTS

| 3,234,191 | A  | 2/1966  | Woods et al.  |
| 6,596,267 | B1 | 7/2003  | Hubbell et al. |
| 2009/0285989 | A1 | 11/2009 | Lozman et al. |
| 2010/0226963 | A1 | 9/2010  | Cooper et al. |

OTHER PUBLICATIONS

Cambre et al. JACS 2007, 129, 10348-10349.*
J M El Khoury (PhD Dissertation, The University of Akron, 2005).*
International Search Report and Written Opinion for PCT/US2012/066264 dated Feb. 15, 2013.
Dandin et al., Optical filtering technologies for integrated fluorescence sensors, *Lab on a Chip* (Jul. 10, 2007), 7(8):955-977 (Abstract).
Hwang et al., Synthesis and characterization of photoconducting non-linear optical polymers containing indole-benzoxazole moiety, *Polymer* (2001), 42:3023-3031.
Katsuki et al., Preparation of Carbazole Polymer Thin Films by Electron-Assisted Deposition of 3-(N-Carbazolyl)propryl Acrylate, *Japanese Journal of Applied Physics* (2005), 44(6A):4182 (Abstract).

(Continued)

*Primary Examiner* — Vu A Nguyen
(74) *Attorney, Agent, or Firm* — Pepper Hamilton LLP

(57) ABSTRACT

Paints and coatings that change the coated surface from hydrophobic to a hydrophilic, self-cleaning surface when exposed to atmosphere are described. The compositions include a plurality of boronic acid functionalized polymers, and a blocking agent contacting at least one of the plurality of boronic acid, wherein the blocking agent is configured to be removed by a stimulus to provide a renewable hydrophilic, self-cleaning polymer coating.

19 Claims, 3 Drawing Sheets

(56) References Cited

OTHER PUBLICATIONS

Kimyonok et al., Norbornene-Based Copolymers with Iridium Complexes and Bis(carbazolyl)fluorene Groups in Their Side-Chains and Their Use in Light-Emitting Diodes, *Chem. Mater.* (Oct. 16, 2007), 19:5062-5608.

Madani et al., Experimental study of liquid-crystal alignment on a surface relief grating, *Laser Physics* (Aug. 2006), 16(8):1197-1201 (Abstract).

Meinhold, Aromatic Boronic Acids as Wood Preservatives, Including Solid State NMR Studies, Industrial Research Limited, Issue 89 (1993).

Miyaura et al., Stereoselective synthesis of arylated ($E$)-alkenes by the reaction of alk-1-enylboranes with aryl halides in the presence of palladium catalyst, *J. Chem. Soc., Chem. Commun.* (1979), 19:866-867 (Abstract).

Miyaura et al., Palladium-Catalyzed Cross-Coupling Reactions of Organoboron Compounds, *Chem. Rev.* (1995), 95:2457-2483.

Pietsch et al., PMMA based soluble polymeric temperature sensors based on UCST transition and solvatochromic dyes, *Polym. Chem.* (2010), 1:1005-1008.

Superhydrophobic and Superhydrophilic Coatings JIB-2519, Technology Transfer and Intellectual Property Management, Berkeley Lab, http://www.lbl.gov/tt/techs/lbn12519.html (Printed from Internet May 7, 2012).

Yersin, Highly Efficient OLEDs with Phosphorescent Materials, Copyright 2008, (TOC).

\* cited by examiner

HYDROPHOBIC COATINGS THAT PROVIDE RENEWABLE HYDROPHILIC SURFACE

CLAIM OF PRIORITY

This application is a U.S. national stage filing under 35 U.S.C. §371 of International Application No. PCT/US2012/066264 filed on Nov. 21, 2012 and entitled "Hydrophobic Coatings that Provide Renewable Hydrophilic Surface", which is incorporated herein by reference in its entirety.

BACKGROUND

Coatings and paints are routinely used to beautify and protect substrates. The most simple coatings and paints are made of a polymer (the binder) in a solvent (the vehicle), which is commonly called a lacquer. Paints and coatings modify the appearance of an object by adding color, gloss, or texture, and by blending with or differentiating from a surrounding environment. For example, a surface that is highly light scattering (i.e., a flat surface) can be made glossy by the application of a paint that has a high gloss. Conversely, a glossy surface can be made to appear flat. Thus, the painted surface is hidden, altered, and ultimately changed in some manner by the presence of the coating. In addition, paints also protect the surface from the surrounding elements and prevent or reduce the corrosive process.

Paints and coatings, while protecting the substrate from external environment, can themselves get dirty. The dirt can dull the coating by increasing the light scattering or by modifying the color of the coating. The dirt can also affect the durability of a paint. There remains a need to develop coatings with hydrophilic surface and self-cleaning properties. A hydrophilic surface would allow water to spread out in a thin pool, sweeping dirt off the surface as the water puddles or thins out and trickles away. This type of "self-cleaning" behavior is advantageous to an exterior paint, as it keeps the coating clean without requiring extensive cleaning by the customer. A hydrophilic surface would allow water to sheathe over the surface and either solvate or even carry away the dirt molecules.

SUMMARY

The present disclosure provides paints and coatings that change the coated surface from hydrophobic to a hydrophilic, self-cleaning surface when exposed to atmosphere. In one embodiment, a coating composition may be a plurality of boronic acid functionalized polymers, and a blocking agent contacting at least one of the plurality of boronic acid groups, wherein the blocking agent is configured to be removed by a stimulus to provide a renewable hydrophilic, self-cleaning polymer coating.

In an another embodiment, a method of preparing a renewable hydrophilic coating composition may involve: (a) contacting at least one boronic acid with at least one blocking agent to form a blocked boronic acid moiety; (b) contacting the blocked boronic acid moiety with an organic halide to form an ester; and (c) polymerizing the ester to form the coating composition.

In an additional embodiment, a method of coating a substrate may involve applying a coating composition to the substrate, wherein the coating composition comprises a plurality of boronic acid functionalized polymers, and a blocking agent contacting at least one of the plurality of boronic acid groups, wherein the blocking agent is configured to be removed by a stimulus to provide a renewable hydrophilic, self-cleaning polymer coating.

In a further embodiment, an article of manufacture may include a coating covering at least a portion of the article, wherein the coating comprises a plurality of boronic acid functionalized polymers, and a blocking agent contacting at least one of the plurality of boronic acid groups, wherein the blocking agent is configured to be removed by a stimulus to provide a renewable hydrophilic, self-cleaning polymer coating.

DETAILED DESCRIPTION

This disclosure is not limited to the particular systems, devices and methods described, as these may vary. The terminology used in the description is for the purpose of describing the particular versions or embodiments only, and is not intended to limit the scope.

Decorative coatings and paints are high volume consumer products. As the name implies, a function of a decorative coating is to make an object look more visually appealing. However, in addition to accomplishing the beautification of an object, the coating can also afford some degree of substrate protection. As paints and coatings become covered and contaminated with unwanted substances, the appearance of the object often changes in undesirable ways. It is often expensive to clean the coated surface, and the detergents, surfactants, fragrances, alkali, lime, and/or other chemicals used to clean the surface make their way into the environment where they can potentially cause great damage. Thus, it is desirable to have a coating that keeps dirt from sticking to the surface, is self-cleaning, and contains environmentally friendly chemicals. The present disclosure provides hydrophobic polymer emulsions with a hydrophilic surface that is self-cleaning. The hydrophilic surface provides a large contact angle with water and helps water to sheath off, leaving it clean. The hydrophilic surface constantly renews itself as it is worn.

The present disclosure provides methods and compositions for paints and coatings that provide a hydrophilic, self-cleaning surface when coated on a substrate. In some embodiments, a coating composition may be a polymer having a plurality of boronic acid groups and a blocking agent contacting at least one of the plurality of boronic acid groups. The ester linkage formed between the blocking agent and the boronic acid may become hydrolyzed upon exposure to atmospheric water.

In some embodiments, the polymer may be a vinyl polymer, an acrylic polymer, or a styrenic polymer. Examples of polymers include, but are not limited to, alkyl methacrylate polymers, allyl methacrylate polymers, acrylic acid polymers, methacrylic acid polymers, acrylamide polymers, 2-hydroxyethyl methacrylate polymers, 2-hydroxypropyl methacrylate polymer, thioethyl methacrylate polymer, vinyl methacrylate polymers, vinyl benzene polymers, 2-hydroxyethyl acrylate polymers, butyl acrylate polymers, 2-ethylhexyl acrylate polymers, vinyltrimethoxysilane polymers, vinyltriethoxysilane polymers, vinyltoluene polymers, α-methyl styrene polymers, chlorostyrene polymers, styrenesulfonic acid polymers, and the like. Combinations of more than one polymer may also be used in the composition.

Figure 1:
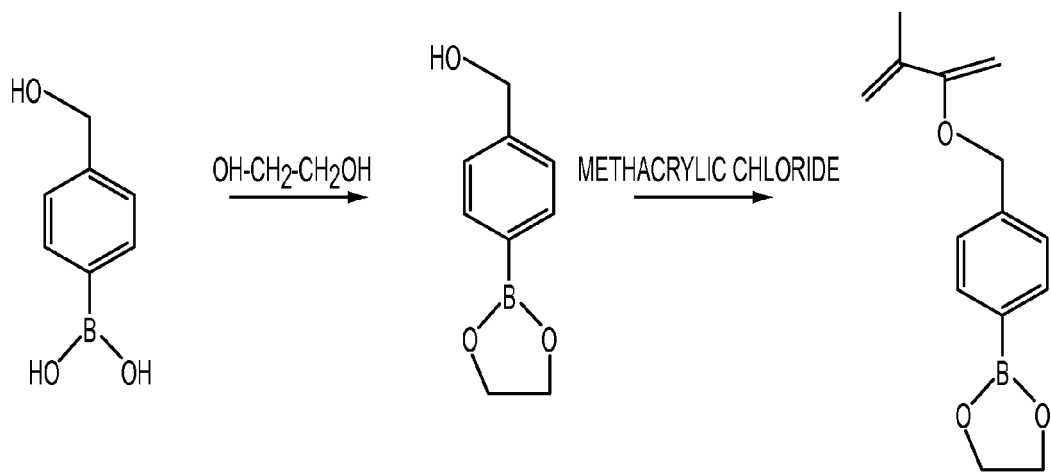
FIG. 1 depicts the synthesis of a blocked boronic acid acrylic monomer according to an embodiment.
Figure 2:
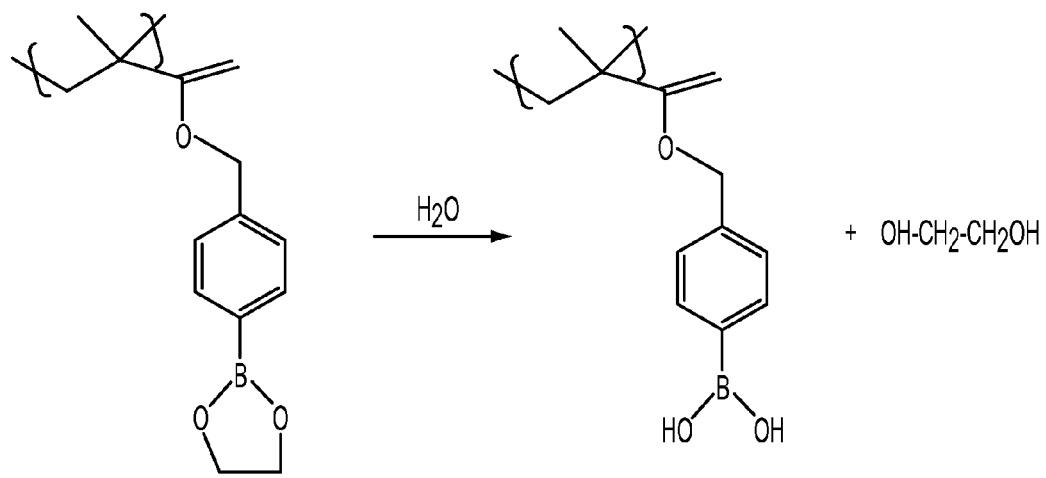
FIG. 2 depicts the hydrolysis of a blocked boronic acid group in the polymer according to an embodiment.

In some embodiments, the boronic acid groups may be blocked with one or more blocking agents, and the blocking group may impart hydrophobicity to the polymers. However, when exposed to atmospheric water, the blocked boronic acid groups at the surface may hydrolyze to form hydrophilic —B(OH)$_2$ borate moieties. This is illustrated in FIG. 1 and FIG. 2. Thus, the hydrophobic polymeric surface may change to a hydrophilic surface upon reacting with atmospheric water and moisture. Further, other atmospheric stimuli, such as air, gas, light, sunlight, or heat, may also cause the hydrolysis of the blocked boronic acid groups. Examples of blocking agents include, but are not limited to, ethylene glycol, propylene glycol, neopentyl glycol, 1,3-propandiol, 2,3-dimethyl-2,3-butanediol, 2-methyl-propane-1,2-diol, ethylene diamine, diethyl triamine, or any combination thereof. As a result of the properties mentioned herein, the coating may provide a hydrophilic self-cleaning surface in addition to protecting the substrate. Thus, the bulk of the polymer may not react with water and as such can remain in a hydrophobic state until the surface is exposed to atmospheric water where it can form a hydrophilic surface.

In addition, paints and coatings may contain one or more additives in their composition. These additives alter properties of the paint, such as shelf life, application and longevity, and health and safety. Such additives may be added, for example, during the manufacture of the emulsion polymer or during the formulation of the paint itself. Illustrative additives may include initiators, rheology modifiers, preservatives, coalescing agents, and the like. Initiators are a source of free radicals to initiate the polymerization process in which monomers condense to form the polymers. Coatings may contain a redox system initiator, such as ferrous and thiosulfate along with the persulfate salts, that promote polymerization at room temperature.

Thickeners and rheology modifiers may be added to coatings to achieve desired viscosity and flow properties. Thickeners function by forming multiple hydrogen bonds with the acrylic polymers, thereby causing chain entanglement, looping and/or swelling which results in volume restriction. Thickeners, such as cellulose derivatives including hydroxyethyl cellulose, methyl cellulose and carboxymethyl cellulose, may be used in the compositions.

One or more preservatives may be added in the coating compositions in low doses to protect against the growth of microorganisms. Preservatives, such as methyl benzisothiazolinones, chloromethylisothiazolinones, barium metaborate and 1-(3-chloroallyl)-3,5,7-triaza-1-azoniaadamantane chloride, may be used.

Coalescing agents, such as ester alcohols, benzoate ethers, glycol ethers, glycol ether esters and n-methyl-2-pyrrolidone, may be added to the coating compositions. Coalescing agents are added to, for example, insure film formation under varying atmospheric conditions. They may be slow evaporating solvents with some solubility in the polymer phase. They may also act as a temporary plasticizer, allowing film formation at temperatures below the system's glass transition temperature. After film formation, the coalescing agents may slowly diffuse to the surface and evaporate, increasing the hardness and block resistance of the film.

Coatings may further contain one or more of the following additives: solvents, pigments, plasticizers, surfactants and the like. Surfactants may be used, for example, to create the micelles for particle formation, as well as long-term particle stabilization, and these provide stability through electrostatic and steric hindrance mechanisms. Both ionic and non-ionic surfactants may be used. Examples may include, but are not limited to, alkyl phenol ethoxylates, sodium lauryl sulfate, dodecylbenzene sulfonate, polyoxyethylene alkyl ethers, polyoxyethylene alkyl allyl ethers, acetylene glycols, polyoxyethylene, stearic acid and polyoxypropylene.

One or more plasticizers may be added to the compositions to adjust the tensile properties of the paint film. Plasticizers include, for example, a glucose-based derivative, a glycerine-based derivative, propylene glycol, ethylene glycol, phthalates and the like.

The paints, according to the disclosure, may further include one or more pigments. The term "pigments" is intended to embrace, without limitation, pigmentary compounds employed as colorants, including white pigments, as well as ingredients commonly known in the art as "opacifying agents" and "fillers". Pigments may be any particulate organic or inorganic compound and may provide coatings the ability to obscure a background of contrasting color (hiding power).

In some embodiments, the method for preparing the coating composition may involve the following steps: (a) contacting at least one boronic acid with at least one blocking agent to form a blocked boronic acid moiety; (b) contacting the blocked boronic acid moiety with an organic halide to form an ester; and (c) polymerizing the ester to form the coating composition. The boronic acids may be aryl or alkyl boronic acids. Non-limiting examples of boronic acids that may be used are 4-hydroxybenzyl boronic acid, vinyl boronic acid, alpha methyl vinyl boronic acid, 2-allyl boronic acid, 2-but-3-enyl-boronic acid, 2-hex-5-enyl-boronic acid, 1-boronic acid-2-yl-2-methyl-propenone, or any combination thereof.

The first step of the reaction involves reacting the boronic acid dissolved in toluene with a blocking agent under a reflux. A Dean-Stark apparatus or any other equivalent reflux apparatus may be used for this process. The blocking agents used may be ethylene glycol, propylene glycol, neopentyl glycol, 1,3-propandiol, 2,3-dimethyl-2,3-butanediol, 2-methyl-propane-1,2-diol ethylene diamine, diethyl triamine, or any combination thereof. The blocking agent and the boronic acid may be mixed in a molar ratio of about 1:0.5 to about 1:1.5, of about 1:0.5 to about 1:1.25, of about 1:0.5 to about 1:1, of about 1:0.5 to about 1: 0.975, of about 1:0.5 to about 1:0.75. Specific examples include, for example, about 1:0.5, about 1:0.75, about 1:0.975, about 1:1, about 1:1.25, about 1:1.5 and ranges between (and including the endpoints of) any two of these values. The reflux reaction is performed under inert conditions, by passing argon, nitrogen or helium.

The second step involves reacting a boronic acid moiety with blocked hydroxyl or amino groups with an acrylic acid halide or an acrylic alkyl chloride. This reaction may result in displacement of halides via SN1 or SN2 reactions. Examples of acrylic acid halides that may be used are methacrylic acid chloride, ethacrylic acid chloride, thioethyl methacrylic halide, 2-chloroethyl methacrylate, 2-bromoethyl methacrylate, 2-iodoethyl methacrylate, 2-tosylethyl methacrylate, methyl methacrylic halide, ethyl methacrylic halide, vinyl methacrylic halide, 2-hydroxyethyl acrylic halide, butyl acrylic halide, 2-ethylhexyl acrylic halide, p-styrenesulfonic acid halide, 4-vinylbenzyl halide, 4-vinylbenzoic acyl halide, ethenesulfonyl halide, vinyl phosphonic acid halide and the combinations thereof. The blocked boronic acid moiety and the acrylic halide are reacted in the presence of triethyl amine to form an ester. An exemplary ester obtained by such a reaction is 2-methyl-acrylic acid 4- [1,3,2]dioxaborolan-2-yl-benzyl ester.

The final step involves polymerization of the ester, and may be performed by an emulsion polymerization process. This involves heating a mixture containing water, an initiator, and a surfactant and adding the ester dropwise to the mixture with constant stirring. The initiator/surfactant mixture and ester are vigorously mixed to form micelles. The rate at which the ester is added may be varied to obtain micelles of different sizes which influence film formation. In some embodiments, the mixture is heated to a temperature of about 50° C. to about 95° C., about 50° C. to about 80° C., or about 50° C. to about 70° C. Specific examples include about 50° C., about 60° C., about 70° C., about 74° C., about 80° C., about 95° C., and ranges between (and including the endpoints of) any two of these values. The mixing process may be performed for about 1 hour to about 12 hours, for about 1 hour to about 8 hours, for about 1 hour to about 6 hours, or for about 1 hour to about 4 hours. Specific examples include about 1 hour, about 2 hours, about 4 hours, about 6 hours, about 7 hours, about 8 hours, about 9 hours, about 12 hours, and ranges between (and including the endpoints of) any two of these values. Some of the surfactants that may be used in the process are dodecyl sulfate, alkyl phenol ethoxylate, sodium lauryl sulfate, dodecylbenzene sulfonate, polyoxyethylene alkyl ethers, polyoxyethylene alkyl allyl ethers, acetylene glycols, polyoxyethylene, polyoxypropylene or any combination thereof. Examples of initiators that may be used include, but are not limited to, benzoyl peroxide, persulfates, water soluble azo initiators, water soluble peroxides, persulfate redox systems or any combination thereof. The resulting product is an emulsion containing polymer particles suspended in water. Various additives, such as pigments, coalescing agents, rheology modifiers, fungicides, plasticizers, nitrates and the like may be added. When the coating is applied on a substrate, the water evaporates and the polymer particles of the emulsion coalesce to form a solid film.

The coatings of the present disclosure may be a latex emulsion, non-aqueous dispersion, or powder. The coatings may be used as a decorative coating, an industrial coating, a protective coating, a self-cleaning coating, an anti-oxidant coating, or any combination thereof. The coatings may generally be applied to any substrate. The substrate may be an article, an object, a vehicle or a structure. Although no particular limitation is imposed on the substrate to be used in the present disclosure, exemplary substrates include, an exterior of a building, vehicles, bridges, airplanes, metal railings, fences, glasses, plastics, metals, ceramics, wood, stones, cement, fabric, paper, leather, and combinations or laminations thereof may be used. The coating may be applied to a substrate by spraying, dipping, rolling, brushing, or any combination thereof.

Figure 3:
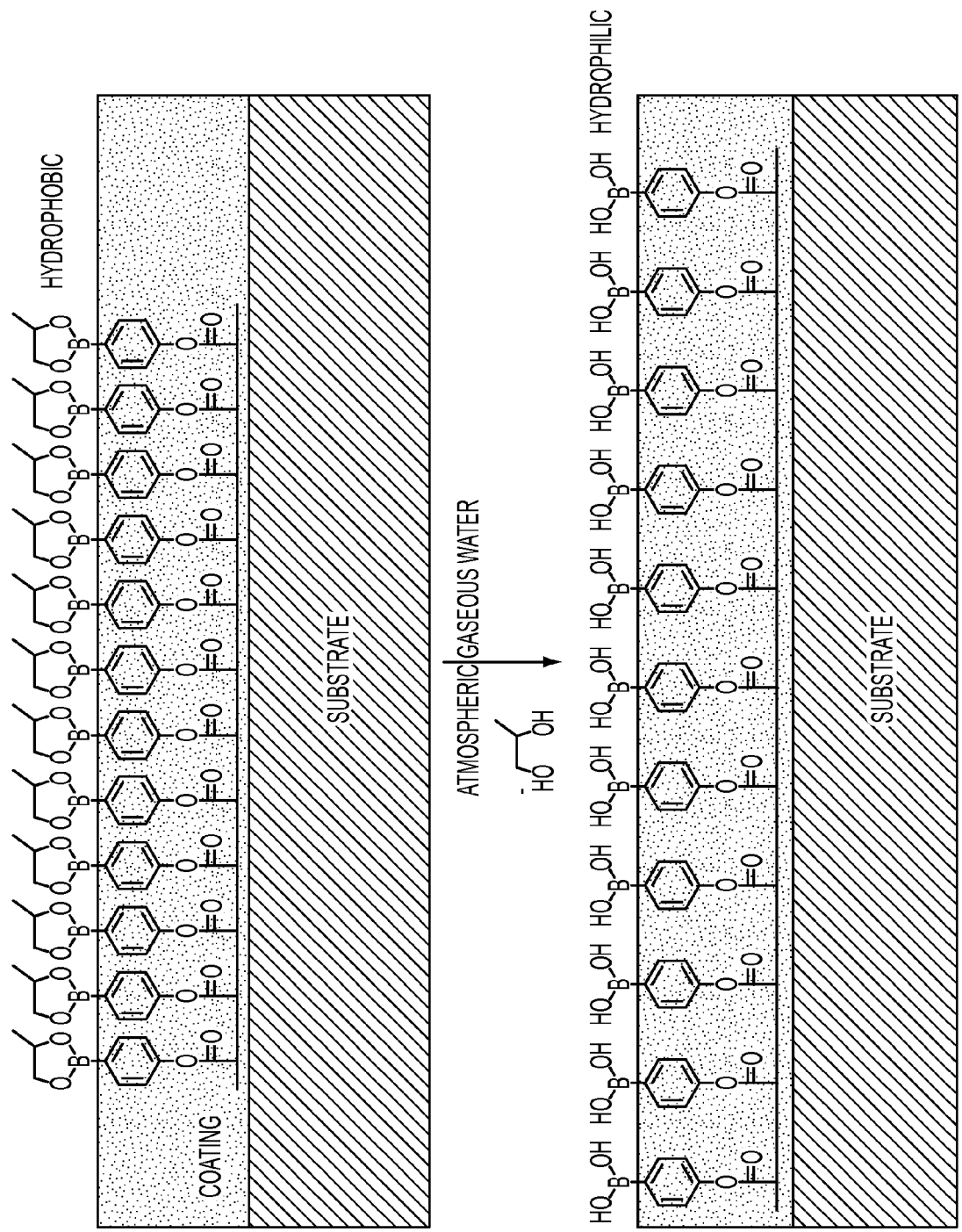
FIG. 3 illustrates the coating of a surface with a paint composition containing a polymer with blocked boronic acid groups according to an embodiment.

An illustrative coating embodiment is depicted in FIG. 3. The film surface is hydrophobic in nature, but when exposed to atmospheric water it quickly loses its blocking moieties due to hydrolysis. The removal of the blocking moieties results in a surface with hydrophilic borate ($—B(OH)_2$) moieties. As the surface of the film is worn, more of the borate moieties will be continuously formed at the surface. These modifications only take place at the surface of the film as the bulk of the film always remains hydrophobic. Thus, the hydrophilic nature of the film's surface is renewable while the bulk of the film remains hydrophobic. Further, the amphoteric nature of $—B(OH)_2$ moieties will help to protect the substrate from either acidic or basic contaminants. The borate moieties will help to neutralize these contaminants resulting in formation of salts that are hydrophilic in nature. Thus, the hydrophilic nature of the surface maintains through a wide variety of conditions. Objects coated with a coating prepared according to the teachings of this disclosure are easier to clean, retain their original appearance longer, and are better protected from corrosion as compared to the same object lacking the coating.

EXAMPLES

Example 1

Preparation of Acrylic Monomers with Blocked Boronic Acid Groups

Figure 4:
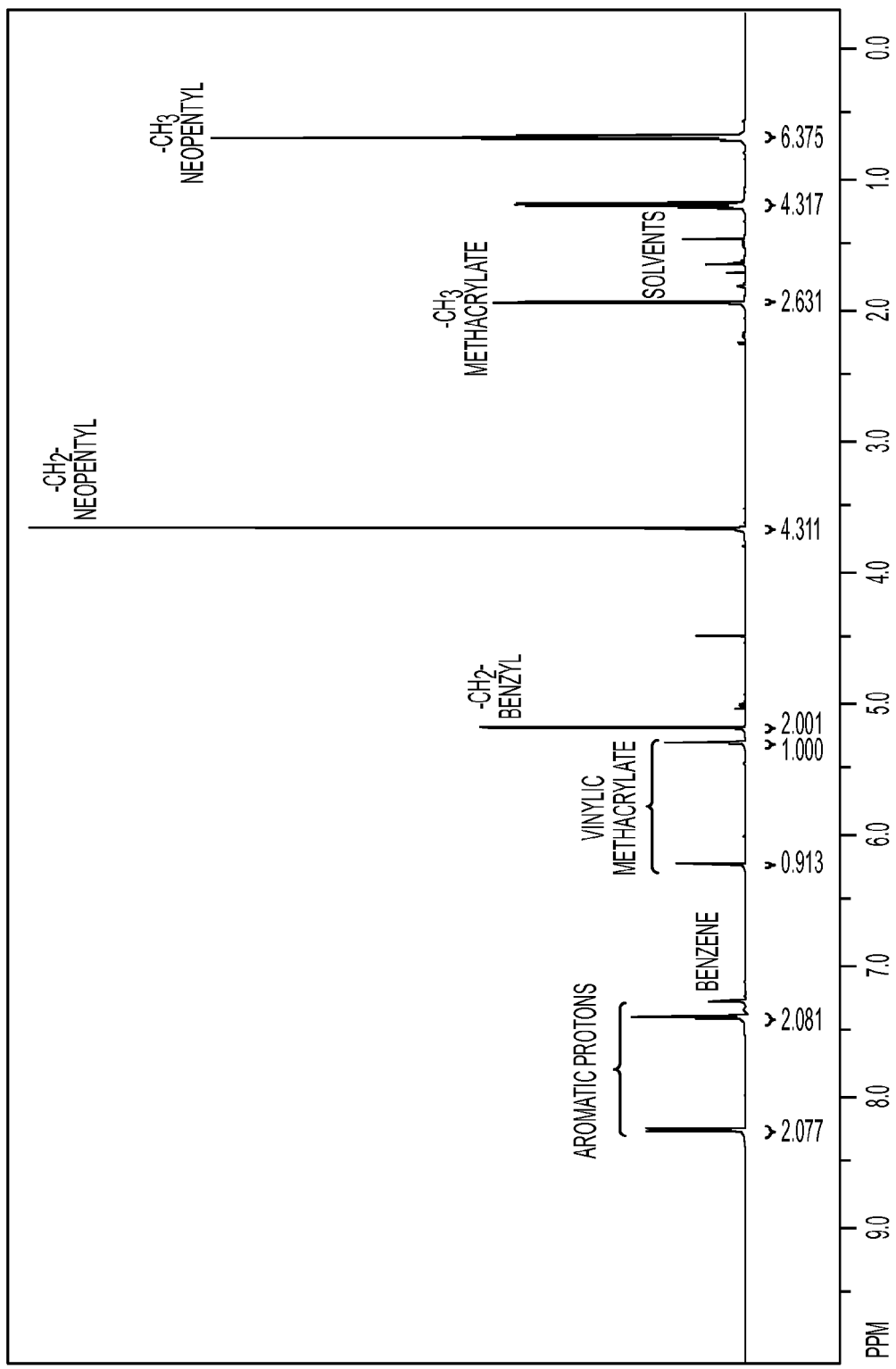
FIG. 4 shows a NMR spectra of an ester compound of blocked boronic acid moiety and acrylic acid according to an embodiment.

About 100 grams of 4-hydroxybenzyl boronic acid was dissolved in 150 mL of toluene and mixed with 71.9 grams of 2,2-dimethyl-1,3-propanediol and purged using argon. The mixture was refluxed using a Dean-Stark apparatus under argon, for about 5 hours. At the end of this period, the mixture was purged with argon and the Dean-Stark trap was removed. The reaction flask was placed in an ice bath and cooled to 0° C. About 120 grams of anhydrous triethyl amine was added to the mixture, followed by dropwise addition of 75.7 grams of methacrylic chloride. The reaction was stirred for a further 5 hours. The solution was then warmed to room temperature and filtered to remove triethylammonium chloride. The toluene was removed by rotary evaporation and the crude solids were purified by column chromatography (55% EtOAc/45% Hexanes) and analyzed by $^1$H NMR, which is shown in FIG. 4.

Example 2

Preparation of Acrylic Monomers with Blocked Boronic Acid Groups

About 100 grams of vinyl boronic acid is dissolved in 200 mL of toluene and mixed with 88.1 grams of ethylene glycol. The mixture is refluxed using a Dean-Stark apparatus under an inert gas, for about 5 hours. At the end of this period, the mixture is purged with inert gas and the Dean-Stark trap is removed. The reaction flask is placed in an ice bath and cooled to 0° C. About 240 grams of anhydrous triethyl amine is added to the mixture, followed by dropwise addition of 174.1 grams of ethacrylic chloride. The reaction is allowed to stir for 5 hours. The solution is then warmed to room temperature and filtered to remove triethylammonium chloride. The toluene is removed by rotary evaporation and the crude solids are purified by column chromatography (55% EtOAc/ 45% Hexanes).

Example 3

Emulsion Polymerization

The reaction process has the following components: a pre-emulsion mix containing 470 grams of 2-methyl-acrylic acid 4-[1,3,2]dioxaborolan-2-yl-benzyl ester, 3.36 grams of nonylphenol polyglycol ether, 0.66 grams of nonylphenol polyglycol ether sodium sulfate, 75.8 grams of water and 0.91 grams of lauryl mercaptan; and an initiator/surfactant mix containing 16.1 grams of nonylphenol polyglycol ether, 3.14 grams of nonylphenol polyglycol ether sodium sulfate, 1.34 grams of polyvinyl alcohol, 2.35 grams of sodium bicarbonate, 33.8 grams of tert-butyl hydroperoxide, 33.8 grams of formaldehyde sulphoxylate and 120.6 grams of water. The initiator/surfactant mix is pre-heated to a temperature of about 74° C. in a jacketed glass reactor and the pre-emulsion mix is slowly added dropwise with constant vigorous mixing. The reaction temperature is slowly raised to 90° C., and the mixing is performed for 6 hours. The resulting emulsion is cooled.

Example 4

Evaluation of Hydrophilic Property

The hydrophilic coating containing the blocked boronic acid acrylic polymer of Example 3 is coated on a glass surface and dried in an oven at 100° C. for 10 minutes. The surface free energy and the water droplet contact angle of the hydrophilic coating is measured as follows. A Zisman plotting method is employed for measuring surface free energy. The surface tension of various concentration of the aqueous solution of magnesium chloride is plotted along the X-axis and the contact angle in terms of $\cos\theta$ is plotted along the Y-axis. A graph with a linear relationship between the two is obtained. The graph is extrapolated such that the surface tension at contact angle 0° is measured and is defined as the surface free energy of the solid. The surface free energy of the glass surface will be 87 milliNewtons/meter.

Example 5

An Object Coated with Hydrophilic Paint

A metal table is painted with a hydrophilic coating containing acrylic polymer with blocked boronic acid groups (Example 3) and is allowed to dry at room temperature. The surface free energy of the chair is measured as explained in Example 4 and will be 87 milliNewton/meter. The anti-fouling property of the coating is measured as follows: A line is drawn on the coated table using oily ink. A similar line is also drawn on a table which is not coated. A water jet is continuously applied on both surfaces and periodically checked to determine whether the oily line is erased. The oily ink applied on the coated table will be erased after 1 minute whereas the oily line on the un-coated table will be un-changed and visible.

Example 6

Evaluating Hydrophilic Properties

The hydrophilic coating containing acrylic polymers with blocked boronic acid groups of Example 2 is coated on a glass substrate and evaluated for the following properties.

Hydrophilicity: The water droplet contact angle in air is measured by using DropMaster 500 (Kyowa Interface Science Co., Ltd) and will be 10°.

Water resistance: The hydrophilic coating is subjected to a rubbing treatment with sponge in 10 reciprocations in water while applying a load of 1 kg, and the amount of residual film is calculated from a change of weight before and after the rubbing treatment. The weight of the residual film will be 99% of the initial weight before rubbing.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more"or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:
1. A coating composition comprising:
   a pigment;
   a coalescing agent;
   a polymer with a plurality of boronic acid functional groups; and
   a blocking agent contacting at least one of the plurality of boronic acid functional groups,
   wherein the blocking agent is configured to be removed by a stimulus to provide a renewable hydrophilic, self-cleaning polymer coating.

2. The composition of claim 1, wherein the polymer is a vinyl polymer, an acrylic polymer, a styrenic polymer, or a combination thereof.

3. The composition of claim 1, wherein the polymer is an alkyl methacrylate polymer, an allyl methacrylate polymer, acrylic acid polymer, methacrylic acid polymer, acrylamide polymer, 2-hydroxyethyl methacrylate polymer, 2-hydroxypropyl methacrylate polymer, thioethyl methacrylate polymer, vinyl methacrylate polymer, vinyl benzene polymer, 2-hydroxyethyl acrylate polymer, butyl acrylate polymer, 2-ethylhexyl acrylate polymer, vinyltrimethoxysilane polymer, vinyltriethoxysilane polymer, vinyltoluene polymer, α-methyl styrene polymer, chlorostyrene polymer, styrenesulfonic acid polymer, or a combination thereof.

4. The composition of claim 1, wherein the blocking agent is ethylene glycol, propylene glycol, neopentyl glycol, 1,3-propandiol, 2,3-dimethyl-2,3-butanediol, 2-methyl-propane-1,2-diol, ethylene diamine, diethyl triamine, or any combination thereof.

5. The composition of claim 1, wherein the polymer is a polymerization product of 2-methyl-acrylic acid 4-[1,3,2] dioxaborolan-2-yl-benzyl ester.

6. The composition of claim 1, wherein the stimulus is water, air, gas, light, sunlight, heat, or any combination thereof.

7. A method of coating a substrate, the method comprising:
   applying a coating composition to the substrate, wherein the coating composition comprises a pigment, a coalescing agent, a polymer with a plurality of boronic acid functional groups, and a blocking agent contacting at least one of the plurality of boronic acid functional groups; and
   removing the blocking agent by a stimulus to provide a renewable hydrophilic, self-cleaning polymer coating.

8. The method of claim 7, wherein applying the coating comprises applying the coating composition comprising a pigment, a coalescing agent, a polymer with a plurality of boronic acid functional groups, and a blocking agent contacting at least one of the plurality of boronic acid functional groups, and wherein the polymer is selected from the group consisting of an alkyl methacrylate polymer, an allyl methacrylate polymer, acrylic acid polymer, methacrylic acid polymer, acrylamide polymer, 2-hydroxyethyl methacrylate polymer, 2-hydroxypropyl methacrylate polymer, thioethyl methacrylate polymer, vinyl methacrylate polymer, vinyl benzene polymer, 2-hydroxyethyl acrylate polymer, butyl acrylate polymer, 2-ethylhexyl acrylate polymer, vinyltrimethoxysilane polymer, vinyltriethoxysilane polymer, vinyltoluene polymer, α-methyl styrene polymer, chlorostyrene polymer, styrenesulfonic acid polymer, and a combination thereof.

9. The method of claim 7, wherein applying the coating comprises applying the coating composition comprising a pigment, a coalescing agent, a polymer with a plurality of boronic acid functional groups, and a blocking agent contacting at least one of the plurality of boronic acid functional groups, and wherein the blocking agent is selected from the group consisting of ethylene glycol, propylene glycol, neopentyl glycol, 1,3-propandiol, 2,3-dimethyl-2,3-butanediol, 2-methyl-propane-1,2-diol ethylene diamine, diethyl triamine, and any combination thereof.

10. The method of claim 7, wherein applying the coating comprises applying the coating composition comprising a pigment, a coalescing agent, a polymer with a plurality of boronic acid functional groups, and a blocking agent contacting at least one of the plurality of boronic acid functional groups, and wherein the polymer is a polymerization product of 2-methyl-acrylic acid 4-[1,3,2]dioxaborolan-2-yl-benzyl ester.

11. The method of claim 7, wherein removing the blocking agent is performed by exposing the blocking agent to the stimulus.

12. The method of claim 11, wherein exposing the blocking agent to the stimulus comprises exposing to water, air, gas, light, sunlight, heat, or any combination thereof.

13. An article of manufacture comprising:
a coating covering at least a portion of the article, wherein the coating comprises a pigment, a coalescing agent, a polymer with a plurality of boronic acid functional groups; and
a blocking agent contacting at least one of the plurality of boronic acid functional groups;
wherein the blocking agent is configured to be removed by a stimulus to provide a renewable hydrophilic, self-cleaning polymer coating.

14. The article of claim 13, wherein the blocking agent is ethylene glycol, propylene glycol, neopentyl glycol, 1,3-propandiol, 2,3-dimethyl-2,3-butanediol, 2-methyl-propane-1,2-diol ethylene diamine, diethyl triamine, or any combination thereof.

15. The article of claim 13, wherein the polymer is a polymerization product of 2-methyl-acrylic acid 4-[1,3,2]dioxaborolan-2-yl-benzyl ester.

16. The composition of claim 1, wherein the polymer is a methacrylate polymer.

17. The composition of claim 1, further comprising a solvent, a rheology modifier, a plasticizer, a surfactant, or any combination thereof.

18. The composition of claim 1, wherein the composition is a latex emulsion, non-aqueous dispersion, or powder.

19. The composition of claim 1, wherein the coating is a decorative coating, an industrial coating, a protective coating, a self-cleaning coating, or any combination thereof.

* * * * *

UNITED STATES PATENT AND TRADEMARK OFFICE
CERTIFICATE OF CORRECTION

| | | |
|---|---|---|
| PATENT NO. | : 9,068,099 B2 | Page 1 of 1 |
| APPLICATION NO. | : 13/881416 | |
| DATED | : June 30, 2015 | |
| INVENTOR(S) | : Carlson et al. | |

It is certified that error appears in the above-identified patent and that said Letters Patent is hereby corrected as shown below:

In the specification

Column 1, Line 7, delete "§371" and insert -- § 371 --, therefor.

Column 6, Line 51, delete "Et0Ac/" and insert -- EtOAc/ --, therefor.

Column 9, Line 1, delete "more"or" and insert -- more" or --, therefor.

Signed and Sealed this
First Day of December, 2015

Michelle K. Lee
*Director of the United States Patent and Trademark Office*